Jan. 4, 1949.  J. J. BAUMAN  2,458,048
HUMIDITY CONTROL SYSTEM
Filed May 27, 1944  2 Sheets-Sheet 1
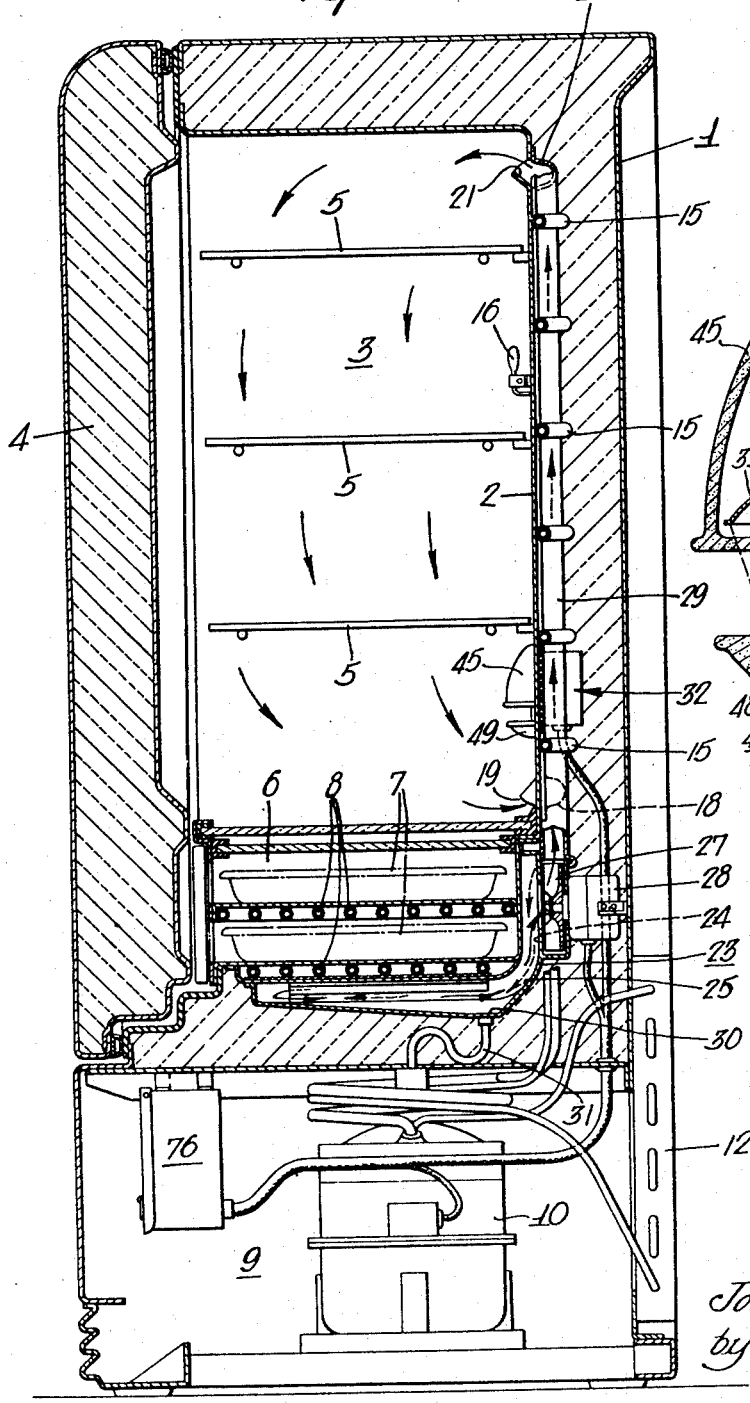
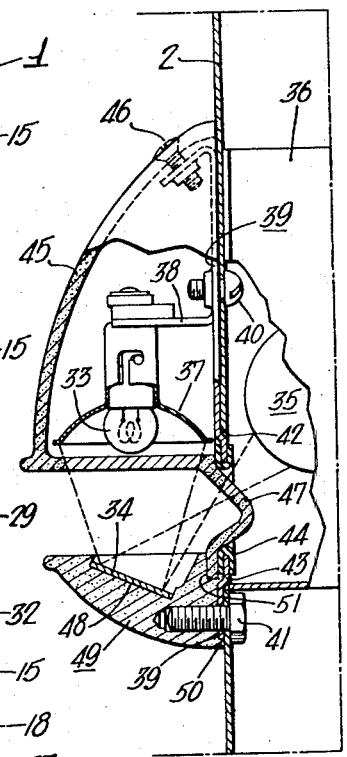
Inventor:
John J. Bauman
by his Attorneys
Howson
& Howson Jan. 4, 1949. J. J. BAUMAN 2,458,048
HUMIDITY CONTROL SYSTEM
Filed May 27, 1944 2 Sheets-Sheet 2

Inventor:
John J. Bauman
by his Attorneys
Howson & Howson

Patented Jan. 4, 1949

2,458,048

UNITED STATES PATENT OFFICE 2,458,048

HUMIDITY CONTROL SYSTEM

John J. Bauman, Abington, Pa., assignor, by mesne assignments, to Philco Corporation, Philadelphia, Pa., a corporation of Pennsylvania Application May 27, 1944, Serial No. 537,701

11 Claims. (Cl. 62—6)

This invention relates to moisture detection and control apparatus. More particularly, the invention is concerned with novel means for controlling the humidity or moisture content of the air within a food storage compartment of a refrigerator.

In modern refrigerators it is highly desirable to provide a "moist-cold" compartment to preserve foodstuffs without dehydration thereof. Consequently, it is desirable to maintain the air in such compartment at a relatively high humidity, but this gives rise to a tendency for the humidity to become excessive at times, causing undesirable condensation upon the compartment walls. This is particularly true in some climates or during certain seasons when the humidity of the atmosphere is at a relatively high value. Therefore, it is desirable to provide some means for controlling the humidity of the air within the said compartment. By way of example, a refrigerating apparatus embodying humidity control is disclosed and claimed in a copending application of M. G. Shoemaker, Serial No. 528,581, filed March 29, 1944, now Patent No. 2,416,354, issued February 25, 1947.

The principal object of the present invention is to provide an improved humidity control apparatus.

A more specific object of the invention is to provide a novel humidity control system which is normally inoperative and which functions to test or sample the humidity or moisture content of the air within a refrigerator food storage compartment during certain intervals including the times when the temperature of the compartment is at substantially its lowest value, at which times excessive humidity is most likely to cause undesirable condensation.

Another object of the invention is to prolong the life of the humidity-control apparatus by maintaining such apparatus normally inoperable and by periodically rendering it capable of operation to test or sample the humidity and, when necessary, to reduce the humidity below the value at which undesirable condensation may occur.

A further object of the invention is to provide an arrangement of this character in which the humidity-control apparatus is under control of the refrigerating system and is rendered operable thereby during the cooling cycle.

Other objects and features of the invention will be apparent hereinafter. In the accompanying drawings:

Fig. 1 is a sectional view of a refrigerator embodying the invention;

Fig. 2 is an enlarged fragmentary sectional view showing the humidity-detector arrangement employed;

Figure 3:
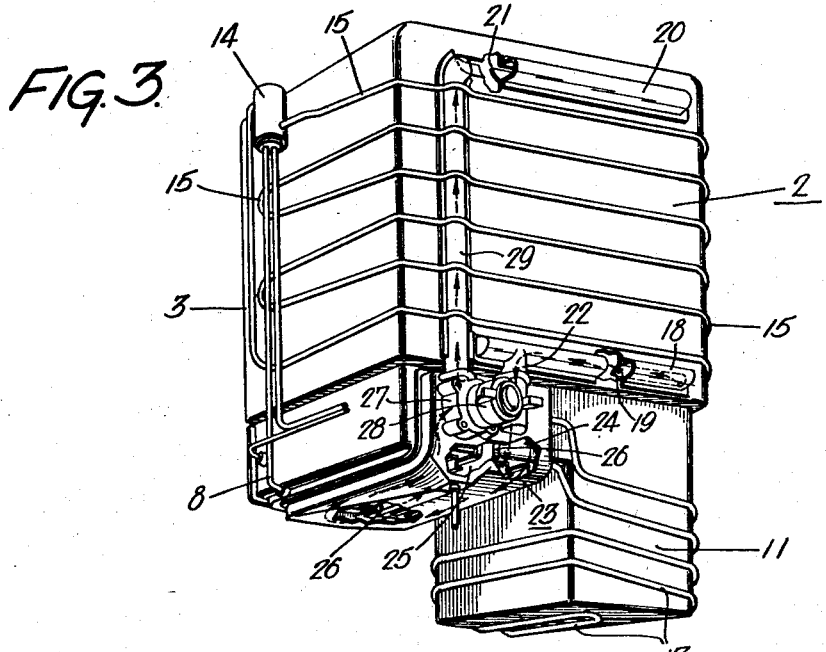
Fig. 3 is a perspective view from the rear of the refrigerator inner tank structure, certain portions being broken away for the sake of illustration.

For the purpose of illustration, the present invention is shown in the drawings as applied to a refrigerator of the specific character disclosed in the aforementioned Shoemaker patent, but it is to be understood that the invention is not only applicable generally to refrigerating and air conditioning devices, but, in the broader aspect, has utility in the general field of hygrometry.

Referring to Fig. 1, there is shown a refrigerator comprising a cabinet which includes an outer shell 1 and an inner metal shell or liner member 2 providing a food storage compartment 3 to which access is had by means of a door 4. Within the compartment or enclosure 3 there are provided shelves 5 to accommodate the stored foodstuffs. As will be described in greater detail hereinafter, the present invention is directed to the control of the humidity or moisture content of the air within the compartment 3, it being desired to maintain the said air at a relatively high humidity and at the same time prevent the humidity from becoming sufficiently high to cause objectionable condensation.

The refrigerator illustrated further comprises an ice-freezing compartment 6 which accommodates ice trays 7 and within which there is provided tubing 8 for conducting a refrigerant. The refrigerator also includes a machinery compartment 9 which houses the compressor unit indicated generally at 10. As shown in Fig. 3, the refrigerator may also be provided with a sharp-freeze compartment 11 for the storage of frozen food, and the like.

The particular refrigerating apparatus chosen for illustration is equipped with primary and secondary refrigerant circuits. Referring to the primary refrigerant circuit, the liquid refrigerant formed in the condenser 12 passes through the tubing 8 and through the tubing 13 associated with the storage compartment 11, and is delivered to a small auxiliary evaporator 14 (Fig. 3) from whence it is returned to the compressor unit 10.

The secondary refrigerant circuit comprises tubing 15 extending about the main food storage compartment 3 and also passing through the housing of evaporator 14, by means of which arrangement the secondary refrigerant is brought into heat exchange association with the primary refrigerant, whereby to return the secondary vapor to the liquid phase. Since the present invention is not concerned with the details of the refrigerating system employed in any particular instance, it is deemed unnecessary to describe such system in greater detail. If desired, reference may be had to the aforementioned Shoemaker application for a detailed description of the particular refrigerating system shown. Furthermore, it should be borne in mind that insofar as the present invention is concerned, the refrigerating system may take any suitable conventional form.

The refrigerating system is controlled in the usual manner by a thermostatic device 16 which controls the circuit of a motor 17 (Fig. 4) forming a part of the compressor unit 10. The thermostatic device is preferably of the usual feeler bulb type.

As disclosed in the aforementioned Shoemaker patent, the humidity or moisture content of the air within compartment 3 may be lowered by circulating the said air in heat exchange relation with a portion of the refrigerating system so as to condense some of the moisture from the air. To this end there is provided a horizontal air-withdrawal duct 18 extending across a substantial portion of the width of liner 2 adjacent the lower part of compartment 3, as shown in Fig. 3, and an aperture 19 is provided in the liner wall in registry with the said duct. A similar air-injection duct 20 extends across the upper part of the liner 2 which is apertured at 21 to permit passage of air from the said duct 20 into the compartment 3. Extending from the lower duct or conduit 18 is a short connection duct 22 which is in communication with a generally L-shaped saddle structure 23 secured in air-tight arrangement with the bottom of compartment 6. As may be seen in Fig. 3, this saddle structure defines an air passage which is divided into inflow and outflow sections 24 and 25, respectively, by means of a partition member 26. A fan 27, which is driven by a motor 28, is in communication with the outflow section 25. A vertical duct 29 serves to convey the air from the fan upward to the duct 20.

When the motor-driven fan 27 is in operation, air is drawn from compartment 3 into duct 18, through the connecting duct 22, through passages 24 and 25, and upward through the duct 29 into duct 20, where it is injected into the compartment 3. The air flow is designated by the arrows in Figs. 1 and 3. In passing through the passages 24 and 25, the air comes into heat exchange relation with the lower refrigerant conduit in compartment 6. Consequently, the moving air gives up a portion of its heat to the refrigerant conduit, thereby reducing the temperature of the said air below the dew point. As a result, some of the moisture in the air is condensed and the resulting condensate flows to a sump or trap 30 formed in the rear portion of the outflow section 25. From this sump, the liquid is delivered through pipe 31 into a receptacle (not shown), which is preferably in association with the compressor unit 10 in order that the condensate may be evaporated by the heat of said unit, and in addition, may provide cooling for the unit.

As thus far described, the illustrated structure corresponds substantially to that shown in the aforementioned Shoemaker patent. In accordance with the present invention, a novel control arrangement and apparatus is provided to control the operation of the fan or blower 27 so as to control the above described humidity-lowering operation. As mentioned at the outset, the present invention contemplates sampling or testing of the humidity or moisture content of the air within a compartment at certain intervals including the times when the temperature of the said air is at its minimum value, at which times excess humidity, if present, is most apt to cause undesirable condensation. An apparatus for accomplishing this object in a refrigerator will now be described.

In association with the compartment 3 there is provided a humidity detecting means, which is represented generally in Fig. 1 by reference character 32, and which is shown in detail in Fig. 2. This detecting means is preferably of electro-optical form and comprises a light source 33, a reflecting mirror 34, and a phototube 35. The mirror 34, which reflects light from source 33 onto the phototube 35, is disposed within the compartment 3 so that it becomes fogged whenever the humidity of the air within the said compartment becomes excessive. The variation in reflected light caused by such fogging of the reflector or mirror is utilized to control the dehumidifying apparatus through the agency of the phototube 35. The complete electrical control system is shown in Fig. 4 and will be described later.

Preferably the electro-optical detector elements are arranged as shown in Fig. 2. The phototube 35 is contained within an enclosure 36 which is mounted on the outside of the liner 2, within the wall structure between the liner and the outer shell 1. The lamp 33 and an associated reflector 37 are carried by an arm 38 which is turned out from a bracket 39 secured to the wall 2 by suitable fastening elements 40 and 41. The wall 2 is provided with an opening 42 within which a portion of the bracket 39 extends. The bracket is apertured and has an offset annular edge portion 43 disposed within the opening 42 and provided with a resilient member 44. A hood 45, which is preferably formed of plastic material, is secured to the bracket 39, as at 46, and has a translucent or transparent portion 47 seated within the opening 42 and engaging the resilient member 44. The mirror 34 is disposed in a recess 48 within a support member 49 which is secured to wall 2 by means of the fastening element 41. The support 49 has a lip 50 on which the lower edge of bracket 39 seats, and the said support is also recessed at 51 to seat the lower part of the extension 47 of the hood 45. Thus the opening in wall 2 is sealed and at the same time the reflected light from lamp 33 is permitted to impinge on the phototube 35 through the extension 47 of the hood member 45.

Figure 4:
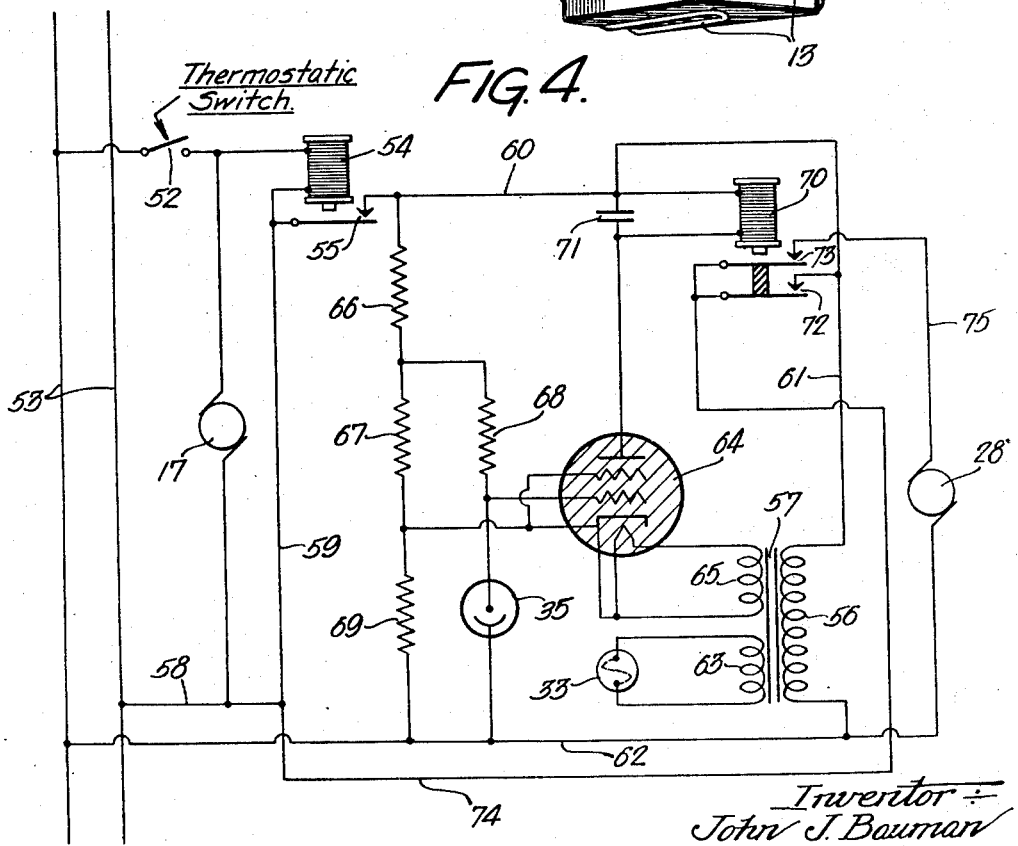
Fig. 4 is an electrical diagram of the humidity control system provided by the present invention.

Referring now to Fig. 4, there is shown one form of an electrical control circuit for accomplishing the purposes of the present invention. The thermostatic switch 52 forms part of the thermostatic control device 16 hereinbefore mentioned, and is adapted to be actuated by the feeler bulb in accordance with known practice. This switch is connected in series with the compressor motor 17 across the electrical supply line 53. Thus, whenever the thermostatic switch 52 closes, the compressor unit is operated to lower the temperature within the compartment 3 in the usual manner. A relay 54 has its winding connected in shunt relation with the motor 17 so that closure of switch 52 also serves to energize the said relay. The closing of relay contacts 55 completes a circuit through the primary winding 56 of a transformer 57, which circuit extends from the right-hand supply conductor through connections 58, 59, 60, 61 and 62. Accordingly, the lamp 33 is energized through the transformer secondary winding 63, and the filament of a control tube 64 is also energized through secondary winding 65. This conditions the control apparatus for operation.

The control tube 64 may take the form of a thyratron arranged for activation by the phototube 35. Accordingly, the phototube is connected in a control network comprising resistors 66, 67, 68 and 69, the said network being connected between conductors 60 and 62 so that it is connected across the supply line whenever relay contacts 55 are closed. In the absence of excessive humidity within compartment 3, the phototube 35 receives a maximum amount of light from lamp 33 and therefore the resistance of the phototube is relatively low and the potential difference between the control grid and cathode of tube 64 is insufficient to activate or fire the control tube. However, when the humidity within compartment 3 becomes excessive and causes fogging of the mirror 34, the greatly reduced light impinging on the phototube 35 causes its resistance to rise to a relatively high value, with the result that the voltage on the control grid of tube 64 is raised sufficiently to fire the tube.

It will be noted that the resistors 67, 68 and 69 and the phototube 35 are arranged in a bridge circuit. By a proper choice of resistance values, the bridge may be balanced when the light on the phototube is a maximum and the resistance of the phototube is low. At such time, the A. C. grid potential is substantially zero. When the light on the phototube decreases and the resistance of the latter increases, the bridge is unbalanced and the A. C. grid potential increases sufficiently to fire the tube 64. The resistor 66 is simply a voltage dropping resistor.

When the control tube 64 becomes conductive, it energizes the winding of a relay 70 which is connected in the plate circuit of tube 64. The condenser 71 serves to prevent undesirable chatter of the relay. The relay 70 is provided with two sets of contacts 72 and 73. Closure of contacts 72 completes a circuit connection 74 which insures continued operation of the dehumidifying apparatus in the event that the mirror remains fogged after relay 54 is deenergized by the opening of the thermostatic switch 52. Contacts 73 of relay 70 complete an energizing circuit for the fan motor 28, which circuit extends from the right-hand supply conductor through connections 58 and 74, contacts 73, connection 75, motor 28 and connection 62 to the left-hand supply conductor. Thus, the energization of relay 70 initiates operation of the motor-driven fan 27 (Fig. 3) which serves to lower the humidity within compartment 3 as previously described.

When the humidity within compartment 3 has been lowered to such an extent that the mirror 34 is no longer fogged, the phototube 35 receives a greater amount of light and its resistance decreases, thereby decreasing the A. C. voltage on the control grid of tube 64 below the firing level. Since the tube 64 is A. C. operated the plate current will be interrupted. At such time the relay 70 is deenergized, thereby interrupting the operation of the fan motor 28. Plate current will not again flow until the A. C. grid potential again reaches the firing level.

While a specific form of control circuit is shown in Fig. 4, it will be appreciated that there is a wide variety of arrangements which could be employed. For example, the control tube 64 could be a vacuum tube normally biased to cut-off, and the phototube 35 could be arranged to control the grid potential so as to render the tube conductive in response to excessive humidity within compartment 3.

The control apparatus may be arranged on the refrigerator in any suitable manner. For example, the control tube, resistors, relays, etc., may be mounted in a container such as shown at 76 in Fig. 1.

From the foregoing description, it will be seen that the invention has provided an arrangement whereby the humidity within compartment 3 is sampled or tested at certain intervals including the times when the temperature of the air in said compartment is at its minimum value. Such arrangement has the added advantage that the control apparatus is normally inoperative and is rendered operable only during the said intervals, so that the life of the control apparatus is greatly prolonged. This is particularly important in respect to the control tube which forms part of the control apparatus.

While the apparatus illustrated is adapted to decrease the humidity of the area under control, the invention is equally applicable to an arrangement for increasing the humidity of said area, and such arrangement may be embodied in the system shown. For example a solenoid, adapted to control a humidifier of any known type, could be connected across conductors 60 and 62 so as to be energized when relay 54 is energized. The solenoid, when energized, would effect operation of the humidifier. Such solenoid could be deenergized in response to energization of relay 70 by providing additional normally closed contacts on the latter and by including such contacts in the branch circuit of the solenoid. Thus the humidifier would operate, in response to energization of relay 54, only if the motor 28 remains deenergized.

As indicated above, the invention is not limited to the specific arrangement shown, but is capable of various modifications within the scope of the appended claims.

I claim:

1. In a humidity control apparatus, an enclosure, a refrigerating system for controlling the temperature of said enclosure, means for detecting the moisture content of the air within said enclosure, means controlled by said detecting means for maintaining the moisture content of said air below a predetermined maximum, said last-named means including an electron tube having a heatable cathode, and means responsive to operation of said refrigerating system for rendering said detecting means operable, and for heating said cathode to render said tube operable, only during the cooling cycle.

2. In a humidity control apparatus, an enclosure, a refrigerating system for controlling the temperature of said enclosure, electro-optical means for detecting the moisture content of the air within said enclosure, means controlled by said detecting means for maintaining the moisture content of said air below a predetermined maximum, said last-named means including an electron tube having a heatable cathode, and means responsive to operation of said refrigerating system for rendering said detecting means operable, and for heating said cathode to render said tube operable, only during the cooling cycle.

3. A refrigerator apparatus, comprising a refrigerating compartment, a refrigerating system external to said compartment including cooling means cooperatively associated with said compartment to maintain the temperature therein at a desired value, normally inoperative means including an electric motor for withdrawing air from said compartment and bringing it into heat exchange relation with a portion of said refrigerating system and then returning it to said compartment, whereby to remove moisture from the air, control means including an electron tube for controlling the energization of the motor, means for detecting the moisture content of the air within said compartment and for actuating said electron tube when the moisture content is in excess of a desired value, and means for rendering said electron tube and said moisture-detecting means normally inoperative and for rendering them operative in response to operation of said refrigerating system.

4. A refrigerator apparatus, comprising a refrigerating compartment, a refrigerating system external to said compartment including cooling means cooperatively associated with said compartment to maintain the temperature therein at a desired value, normally inoperative means including an electric motor for withdrawing air from said compartment and bringing it into heat exchange relation with a portion of said refrigerating system and then returning it to said compartment, whereby to remove moisture from the air, control means including an electron tube for controlling the energization of the motor, means for detecting the moisture content of the air within said compartment and for actuating said electron tube when the moisture content is in excess of a desired value, said moisture-detecting means including an electric lamp and a light-responsive device, and means for normally maintaining said electron tube and said lamp de-energized, and for energizing the tube and the lamp in response to operation of said refrigerating system.

5. A refrigerator apparatus, comprising a food-storage compartment, another compartment which it is desired to maintain at lower temperatures than said food-storage compartment, a refrigerating system including cooling means for each of said compartments, conduit means for conveying air from said food-storage compartment into heat exchange relation with the cooling means for said other compartments and back to said food-storage compartment, whereby to remove moisture from the air within said food-storage compartment, means including an electric motor for propelling the air through said conduit means, means including an electron tube for controlling the energization of said motor, means for detecting the moisture content of the air in said food-storage compartment and for actuating said electron tube when the moisture content is in excess of a desired value, and means for rendering said electron tube and said moisture-detecting means normally inoperative and for rendering them operative in response to operation of said refrigerating system.

6. A refrigerator apparatus, comprising a food-storage compartment, another compartment which it is desired to maintain at lower temperatures than said food-storage compartment, a refrigerating system including cooling means for each of said compartments, conduit means for conveying air from said food-storage compartment into heat exchange relation with the cooling means for said other compartment and back to said food-storage compartment, whereby to remove moisture from the air within said food-storage compartment, means including an electric motor for propelling the air through said conduit means, means including an electron tube for controlling the energization of said motor, means for detecting the moisture content of the air in said food-storage compartment and for actuating said electron tube when the moisture content is in excess of a desired value, said moisture-detecting means including an electric lamp and a light-responsive device, and means for normally maintaining said electron tube and said lamp deenergized, and for energizing the tube and the lamp in response to operation of said refrigerating system.

7. A refrigerator apparatus, comprising a refrigerating compartment, a refrigerating system for maintaining the temperature in said compartment at a desired value, said refrigerating system including an electric motor and a thermostatic switch in circuit with said motor, means including a second motor for withdrawing air from said compartment and bringing it into heat exchange relation with a portion of said refrigerating system and then returning it to said compartment, whereby to remove moisture from the air within said compartment, means including an electron tube for controlling the energization of said second motor, means for detecting the moisture content of the air in said compartment and for actuating said electron tube when the moisture content is in excess of a desired value, and a relay connected in shunt with said first motor for rendering said electron tube and said moisture-detecting means normally inoperative and for rendering them operative in response to operation of said refrigerating system.

8. In a humidity control apparatus, an enclosure, a refrigerating system for controlling the temperature of said enclosure, means for testing and controlling the moisture content of the air within said enclosure, electrically-operable switch means for rendering said first means operative in response to operation of said refrigerating system, switch means in shunt with said first switch means for maintaining the operation of said first means independently of the operation of said refrigerating system, and means operable by said first means to actuate said second switch means.

9. A refrigerator apparatus, comprising a refrigerating compartment, a refrigerating system external to said compartment including cooling means cooperatively associated with said compartment to maintain the temperature therein at a desired value, means including an electric motor for lowering the moisture content of the air in said compartment by bringing it into heat exchange relation with a portion of said refrigerating system, control means including an electron tube for controlling the energization of the motor, means for detecting the moisture content of the air within said compartment and for actuating said electron tube when the moisture content is in excess of a desired value, and means for rendering said electron tube and said moisture-detecting means normally inoperative and for rendering them operative in response to operation of said refrigerating system.

10. A refrigerator apparatus, comprising a refrigerating compartment, a refrigerating system external to said compartment including cooling means cooperatively associated with said compartment to maintain the temperature therein at a desired value, means including an electric motor for lowering the moisture content of the air in said compartment by bringing it into heat exchange relation with a portion of said refrigerating system, control means including an electron tube for controlling the energization of the motor, means for detecting the moisture content of the air within said compartment and for actuating said electron tube when the moisture content is in excess of a desired value, said moisture-detecting means including an electric lamp and a photoelectric device, the latter being arranged to vary the controlling voltage applied to said tube, and means for normally maintaining said tube and said lamp de-energized, and for energizing the tube and the lamp in response to operation of said refrigerating system.

11. An apparatus according to claim 10, wherein said electron tube is of the gas-filled type, and said photoelectric device is arranged in a resistance network to which the control electrode of the tube is connected.

JOHN J. BAUMAN.

REFERENCES CITED

The following references are of record in the file of this patent:

UNITED STATES PATENTS

| Number | Name | Date |
|---|---|---|
| 1,960,658 | Brace | May 29, 1934 |
| 2,019,091 | Philipp | Oct. 29, 1935 |
| 2,071,175 | Philipp | Feb. 16, 1937 |
| 2,180,479 | Philipp | Nov. 21, 1939 |
| 2,188,526 | Burden | Jan. 30, 1940 |
| 2,222,242 | Philipp | Nov. 19, 1940 |
| 2,268,785 | Thornthwaite | Jan. 6, 1942 |
| 2,285,946 | Kalischer | June 9, 1942 |